United States Patent
Shibata et al.

(10) Patent No.: US 7,861,548 B2
(45) Date of Patent: Jan. 4, 2011

(54) HEAT PUMP SYSTEM AND HEAT PUMP OPERATION METHOD

(75) Inventors: Takanori Shibata, Hitachinaka (JP); Shigeo Hatamiya, Hitachi (JP); Toshihiko Fukushima, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 459 days.

(21) Appl. No.: 11/476,707

(22) Filed: Jun. 29, 2006

(65) Prior Publication Data

US 2007/0000267 A1  Jan. 4, 2007

(30) Foreign Application Priority Data

Jun. 30, 2005  (JP) ............................. 2005-192488

(51) Int. Cl.
*F25B 27/00* (2006.01)

(52) U.S. Cl. ..................................... 62/238.6; 62/238.7

(58) Field of Classification Search ................ 62/238.6, 62/238.7; 60/464
See application file for complete search history.

(56) References Cited

U.S. PATENT DOCUMENTS

| | | | | |
|---|---|---|---|---|
| 4,454,720 A | * | 6/1984 | Leibowitz | 60/648 |
| 4,580,720 A | * | 4/1986 | Strop et al. | 237/67 |
| 4,896,515 A | * | 1/1990 | Endou | 62/498 |
| 4,961,311 A | * | 10/1990 | Pavel et al. | 60/39.182 |
| 5,224,354 A | * | 7/1993 | Ito et al. | 62/210 |
| 5,809,768 A | * | 9/1998 | Uematsu et al. | 60/39.465 |
| 6,644,062 B1 | * | 11/2003 | Hays | 62/402 |
| 2002/0050134 A1 | * | 5/2002 | Bronicki et al. | 60/39.182 |
| 2003/0150233 A1 | * | 8/2003 | Jensen et al. | 62/268 |
| 2005/0132732 A1 | * | 6/2005 | Eisenhower et al. | 62/183 |

FOREIGN PATENT DOCUMENTS

| | | |
|---|---|---|
| EP | 0 095 439 | 11/1983 |
| EP | 1 213 548 | 6/2002 |
| JP | 63-231150 | 9/1988 |
| JP | 2001-165514 | 6/2001 |
| JP | 2004-150409 | 5/2004 |

* cited by examiner

*Primary Examiner*—William E Tapolcai
*Assistant Examiner*—Lakiya Rogers
(74) *Attorney, Agent, or Firm*—Brundidge & Stanger, P.C.

(57) ABSTRACT

A compact heat pump system and a heat pump operation method, which can avoid the occurrence of surging in a compressor at startup of a heat pump and can directly supply vapor of a working medium produced by the compressor to an external heat-utilizing facility. The heat pump system includes an evaporator for recovering heat of an external heat source to a working medium supplied as liquid water from the exterior via a water feed channel, thereby evaporating the working medium, a compressor for compressing the working medium evaporated in the evaporator and increasing temperature of the evaporated working medium, and a driving unit for giving motive power to drive the compressor. The heat pump system further includes a supply channel for supplying, as a heat source, vapor of the working medium having temperature increased by the compressor to an external heat-utilizing facility, and a return channel branched from the supply channel and introducing the working medium discharged from the compressor to the evaporator.

13 Claims, 3 Drawing Sheets

HEAT PUMP SYSTEM AND HEAT PUMP OPERATION METHOD

BACKGROUND OF THE INVENTION

1. Field of the Invention

The present invention relates to a heat pump system for supplying heat. More particularly, the present invention relates to a heat pump system utilizing vapor (steam) as a heat source for supply to the exterior and a heat pump operation method.

2. Description of the Related Art

A heat pump system employing a turbo compressor, which is operated by using water as a working medium, has already been practiced to supply a low-temperature heat source and utilized in air conditioning systems, etc. For example, JP,A 2001-165514 (Patent Document 1) discloses a technique of integrally packaging an evaporator, a condenser, a compressor, and a compressor driving motor in one enclosed vessel.

Also, JP,A 63-231150 (Patent Document 2) discloses a technique of employing a heat pump which includes an evaporator, a condenser, and a compressor and which is operated by using water as a working medium, and supplying hot water of 100° C. or higher to the exterior through heat exchange in the condenser.

SUMMARY OF THE INVENTION

In each of the above-described known techniques, however, the condenser of the direct contact type or the indirect contact type is provided in a discharge section of the compressor, and heat is supplied to an external heat-utilizing facility by using liquid water obtained by the condenser or a working medium which flows through another line and is subjected to heat exchange in the condenser. In other words, steam discharged from the compressor is not directly supplied to the external heat-utilizing facility.

More specifically, when steam, i.e., a high-temperature and high-pressure working medium, produced by the heat pump is supplied to the exterior, the heat pump is required to include the condenser for indirectly supplying heat to the external heat-utilizing facility. The reason is that, when the steam discharged from the compressor is directly supplied to the external heat-utilizing facility, the pressure in the compressor is about the saturated vapor pressure of 0.002 MPa at room temperature, i.e., 15° C., at startup of the heat pump, and the discharge pressure in the compressor may be lower than the pressure of an inner atmosphere within the external heat-utilizing facility. In the case of the compressor being of the turbo type, such a condition gives rise to a phenomenon that the compressor cannot be started up due to the occurrence of surging.

An object of the present invention is to provide a compact heat pump system and a heat pump operation method, which can avoid the occurrence of surging in a compressor at startup of a heat pump and can directly supply vapor of working medium produced by the compressor to an external heat-utilizing facility.

To achieve the above object, the heat pump system according to the present invention comprises an evaporator for recovering heat of an external heat source to a working medium supplied as liquid water from the exterior via a water feed channel, thereby evaporating the working medium; a compressor for compressing the working medium evaporated in the evaporator and increasing temperature of the evaporated working medium; a driving unit for giving motive power to drive the compressor; a supply channel for supplying, as a heat source, vapor of the working medium having temperature increased by the compressor to an external heat-utilizing facility; and a return channel branched from the supply channel and introducing the working medium discharged from the compressor to the evaporator.

Also, the heat pump operation method according to the present invention comprises the steps of performing heat exchange between a working medium supplied as liquid water from the exterior and an external heat source in an evaporator, thereby evaporating the working medium; driving the compressor by a driving unit and compressing the working medium evaporated in the evaporator, thereby producing vapor of the working medium having increased temperature; causing the vapor of the working medium to flow downstream to the evaporator until the vapor of the working medium discharged from the compressor reaches a desired state; and supplying the vapor of the working medium to an external heat-utilizing facility after the vapor of the working medium discharged from the compressor reaches the desired state.

According to the present invention, the compact heat pump system and the heat pump operation method are realized which can avoid the occurrence of surging in the compressor at startup of the heat pump and can directly supply the vapor of the working medium produced by the compressor to the external heat-utilizing facility.

DESCRIPTION OF THE PREFERRED EMBODIMENTS

The present invention will be described below in connection with embodiments which are able to avoid the occurrence of surging in a compressor at startup of a heat pump and to directly supply vapor of a working medium produced by the compressor to an external heat-utilizing facility with a compact construction.

First Embodiment

A heat pump system according to a first embodiment of the present invention will be described in detail below with reference to FIG. 1.

The heat pump system according to the first embodiment of the present invention comprises an evaporator 42 for evaporating liquid water 35 stored therein as a working medium through heat exchange with a high-temperature heat source, which is supplied from the exterior, and for producing water vapor (steam), i.e., vapor of the working medium, a compression unit 34 driven by a motor 1, i.e., a driving unit, and pressurizing the water vapor produced by the evaporator 42 to high-temperature steam, the motor 1 for driving the compression unit 34, a discharge piping line 25 for supplying the high-temperature steam pressurized by the compression unit 34, and a return piping line 22 for introducing the steam or liquid water from the compression unit 34 to the evaporator 42. In the heat pump system, the high-temperature steam pressurized and produced by the compression unit 34 is branched from a branch point 26 in the discharge piping line 25 and is supplied to an external heat-utilizing facility 20, which consumes heat of the supplied steam, via a heat supply piping line 24 including a valve 23 disposed therein. Also, a part of the high-temperature steam produced by the compression unit 34 is branched from the branch point 26 in the discharge piping line 25 and is introduced to a valve 21 through which the steam is expanded so that the steam pressure and temperature are reduced. The thus-produced low-temperature steam or liquid water is returned to the evaporator 42 via the return piping line 22. Further, the evaporator 42 is provided with a water feed line 31 for, from the exterior, supplying water that is stored as the liquid water 35 in the evaporator 42, and is also provided with a hot water line 40 for supplying a high-temperature heat source which is used to heat and evaporate the stored liquid water.

A branch point 30 and a valve 39 are disposed in the water feed line 31 such that the liquid water 35 of about 15° C. flowing through the water feed line 31 is supplied to the inside of the evaporator 42 via the branch point 30 and the valve 39. A part of the hot water line 40 for supplying the high-temperature heating source is disposed in the evaporator 42 such that heat is supplied to the evaporator 42 from an external heat source of about, e.g., 80° C. via the hot water line 40. In the evaporator 42, the liquid water 35 of about 15° C. supplied through the water feed line 31 and stored in the evaporator 42 is evaporated through heat exchange with the external heat source of 80° C., which is supplied via the hot water line 40, thereby producing water vapor (steam) of about 60° C. and 0.02 MPa. The compression unit 34 is made up of a first-stage compressor 33 and a second-stage compressor 32 for compressing the steam in two stages. The steam produced through heat exchange in the evaporator 42 is supplied to the compressors 33 and 32, while the motor 1 is driven in accordance with a control signal S from a control unit 100 (described later) to rotate the compressors 33 and 32, thereby compressing the supplied steam successively. As a result, the temperature and pressure of the steam discharged from the compressors are increased to produce high-temperature and high-pressure steam of, e.g., about 140° C. and about 0.4 MPa. The high-temperature and high-pressure steam thus produced is supplied, as a heat source, from the compressors 33 and 32 to the external heat-utilizing facility 20 for consumption of heat therein through the discharge piping line 25 and the heat supply piping line 24 provided with the valve 23.

A part of the liquid water supplied to the evaporator 42 through the water feed line 31 from the exterior is introduced to a piping line 31b which is branched from the water feed line 31 at the branch point 30. The supplied liquid water is pressurized to, e.g., about 7 MPa by a pump 5 disposed in the piping line 31b and is further supplied to a mixer 36 after being adjusted in flow rate by a valve 38 disposed in the piping line 31b.

The mixer 36 is disposed in a channel connecting the first-stage compressor 33 with the second-stage compressor 32, which constitute the compression unit 34. The liquid water supplied to the mixer 36 is mixed in and evaporated by the compressed steam introduced from the compressor 33, whereby the temperature of the steam flowing into the second-stage compressor 32 is reduced by latent heat absorbed with the evaporation of the liquid water. Generally, a compressor has such a property that, comparing required compression work at the same pressure ratio, the compression work is reduced as the intake temperature lowers. Therefore, the liquid water added in the mixer 36 to the compressed steam contributes to increasing the mass flow and cutting the compression work as a result of the evaporation of the added water.

The motor 1, i.e., the driving unit, is connected to an end of a shaft integrally coupling the first-stage compressor 33 and the second-stage compressor 32, which constitute the compression unit 34, thereby providing the compression work of the first-stage compressor 33 and the second-stage compressor 32 required for compressing the steam and producing the high-temperature steam. The motor 1 is driven in accordance with the control signal S from the control unit 100 such that the compressors 33 and 32 are rotated to gradually increase a rotational speed thereof.

Initially, low-temperature and low-pressure steam discharged from the compressor 32 is returned to the evaporator 42 while flowing downstream through the return piping line 22 which is branched separately from the heat supply piping line 24 at the branch point 26 in the discharge piping line 25, thus causing the working medium to circulate in the heat pump system. In other words, the valve 21 disposed in the return piping line 22 is opened so that the low-temperature and low-pressure steam discharged from the compressor 32 is returned to the evaporator 42 via the return piping line 22 and circulates in the heat pump system until reaching a steam condition under which the compressors causes no surge.

In order to prevent the compressors from causing a surge, it is required that the compressor discharge pressure is higher than the inner pressure of the external heat-utilizing facility 20 when the above-described circulation system is established. When the heat pump system operates at its design point, the external heat-utilizing facility 20 is in a high-pressure and high-temperature state of, e.g., 0.4 MPa and 120° C. However, when the heat pump system is stopped, the inner pressure of the external heat-utilizing facility 20 can be lowered to at least the pressure of an ambient atmosphere by releasing the facility 20 to the atmosphere.

Accordingly, when the rotational speed of the compressors 32 and 33 is increased and the pressure of the steam, i.e., the working medium in vapor phase, discharged from the second-stage compressor 32 becomes higher than the pressure of the inner atmosphere within the external heat-utilizing facility 20 with which the compressors are in fluid communication, e.g., the atmospheric pressure, this can be regarded as meaning that the condition causing the compressor to generate a surge is avoided. After reaching such a situation, therefore, the valve 21 in the return piping line 22 is closed and the valve 23 in the heat supply piping line 24 is opened, to thereby start supply of the steam discharged from the compressor 32 to the external heat-utilizing equipment 20.

Then, the rotational speed of the compressors 32 and 33 is further increased and the supply of the steam, i.e., the working medium in vapor phase, discharged from the second-stage compressor 32 is continued while increasing the temperature and pressure of the steam. When reaching the steam condition demanded by the external heat-utilizing facility 20, e.g., the high-pressure and high-temperature state of about 0.4 MPa and about 140° C., the compressors are held in the operating conditions at that time to maintain a state that the steam satisfying the above steam condition is continuously supplied from the second-stage compressor 32 to the external heat-utilizing facility 20.

Details of the components and operation of the heat pump system according to this first embodiment will be described below.

Figure 1:
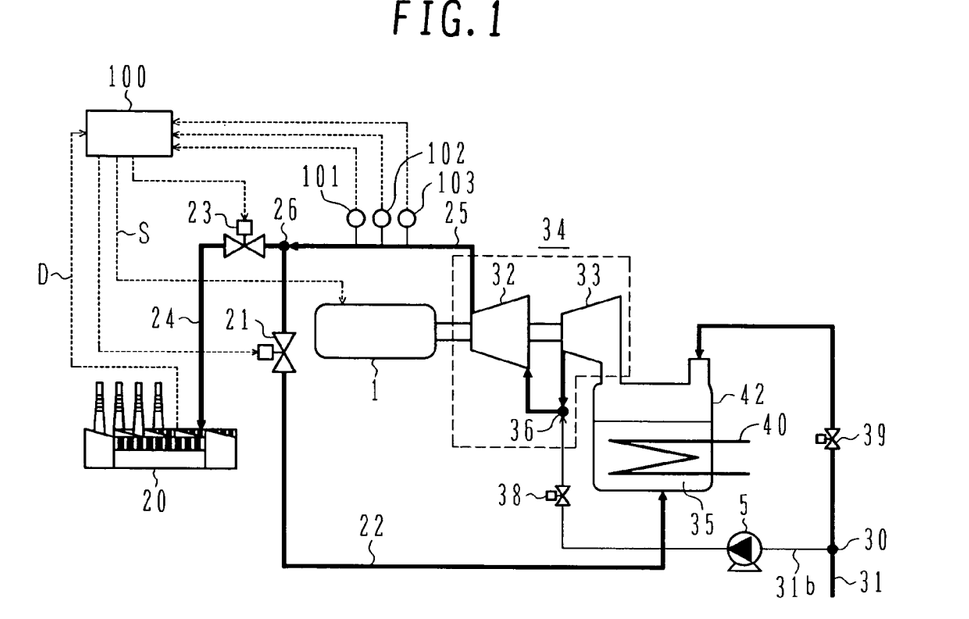
FIG. 1 is a diagram showing the construction of a heat pump system according to a first embodiment of the present invention.

In FIG. 1, hot water heated by an external heat source is supplied, via the hot water line 40, to the evaporator 42 which constitutes the heat pump system according to the first embodiment of the present invention. In this connection, the supplied hot water is preferably produced by utilizing waste heat generated from a factory or a garbage incineration site, or a not-yet-utilized heat source such as a river, sewage or the atmosphere. While the evaporator 42 is shown as employing an indirect heat exchanger in which the hot water supplied via the hot water line 40 and the liquid water 35 stored in the evaporator 42 are not brought into direct contact with each other, it may employ a direct-contact heat exchanger in which the hot water supplied via the hot water line 40 and the liquid water 35 stored in the evaporator 42 are mixed with each other. Also, a heat transfer surface of the hot water line 40, which is positioned inside the evaporator 42, can be arranged so as to constitute a heat exchanger having piping in the form of tubes immersed in the liquid water 35 stored in the evaporator 42, or a plate-type heat exchanger allowing passage of a two-phase flow therein.

A part of the high-temperature steam discharged from the second-stage compressor 32 is supplied to the evaporator 42 via the return piping line 22 when the valve 21 is opened, thereby promoting evaporation of the liquid water 35 residing at the bottom of in the evaporator 42.

Figure 2:
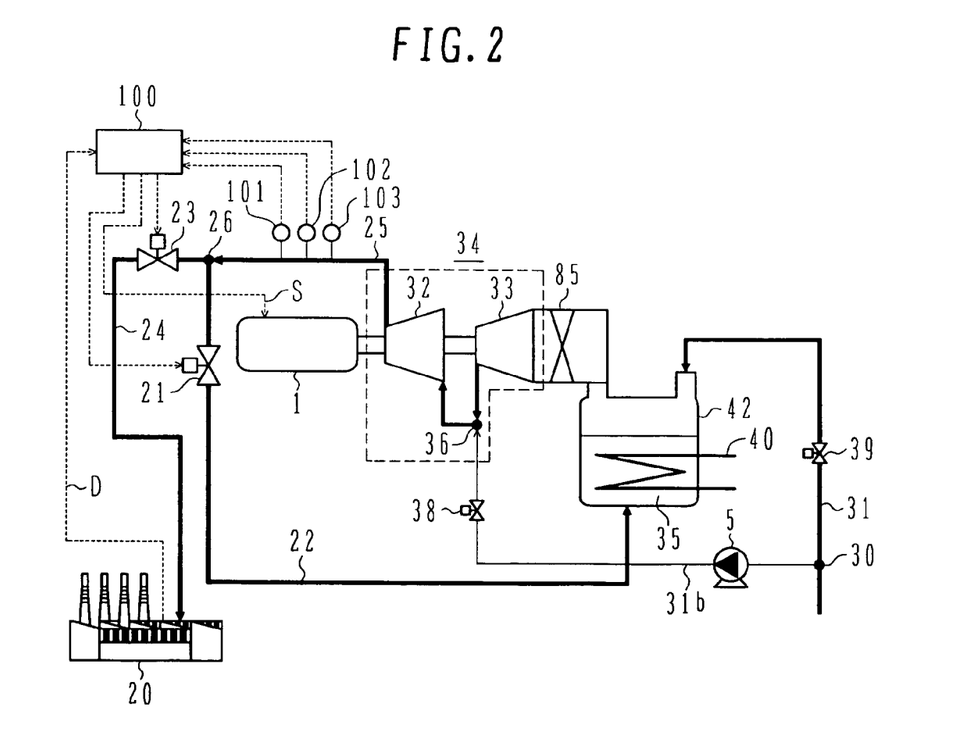
FIG. 2 is a diagram showing the construction of the heat pump system according to the first embodiment of the present invention, in which a variable stator blade is installed in a compressor.

The flow rate of the high-temperature steam flowing through the first-stage compressor 33 and the second-stage compressor 32, which constitute the compression unit 34, is basically affected by the rotational speed of the compressors to a large extent. In order to more positively change the flow rate of the high-temperature steam, however, a variable stator blade 85 may be mounted at an inlet of the first-stage compressor 33 as shown in FIG. 2. By controlling an angle of the variable stator blade 85, the flow rate of the high-temperature steam flowing through the compressors 33 and 32 can be changed over a wider range while the rotational speed and the intake condition of the compressors 32 and 33 are maintained constant. Thus, the compressors can be operated over a wide range of operating conditions without causing a surge.

Through the piping line 31b branched from the water feed line 31, the liquid water is introduced to the mixer 36 disposed midway a channel between the first-stage compressor 33 and the second-stage compressor 32. The mixer 36 can be constituted as the type spraying liquid water into the steam, or the type causing the steam to pass through a container in which liquid water is stored. Also, to promote mixing of a liquid phase and a gas phase, packings for disturbing flow and promoting the mixing may be filled in the mixer 36. In the case of a spraying method, a spray nozzle disclosed in JP,A 2004-150409, for example, can be used as a spray unit. Because the mixing of the liquid phase and the gas phase is promoted to a larger extent with an increase of the contact area between the two phases, a method of spraying fine liquid droplets into the steam is more effective in making the mixer compacter.

In the mixer 36, a part or the whole of the supplied liquid water is evaporated until entering the second-stage compressor 32, and the amount of heat of the steam discharged from the first-stage compressor 33 is deprived of the latent heat required for the evaporation of water, whereby the steam temperature is reduced. The whole or a part of not-evaporated droplets flows into the second-stage compressor 32 together with the steam flow and is evaporated inside the compressor 32 by heat given with a temperature rise of the steam caused by compression work, thus reducing the temperature of the steam under a compression process.

If the supplied liquid water is evaporated only inside the mixer 36, the liquid water can be evaporated in amount just corresponding to the amount of water capable of being evaporated until the water after the mixing reaches a saturated state. Alternatively, by causing the liquid water to flow into the second-stage compressor 32 together with the steam flow, a larger amount of liquid water can be evaporated by utilizing the amount of heat of the steam whose temperature rises due to compression work of the compressor 32. In the case of liquid droplets being flown into the compressor 32, however, unless the liquid droplets are sufficiently atomized, the collision of the liquid droplets against blades of the compressor 32 may give rise to erosion. For that reason, the sprayed water droplets require to be atomized into fine droplets having diameters of not larger than several tens microns.

While FIG. 1 shows an example in which the entirety of the compression unit 34 is divided into the first-stage compressor 33 and the second-stage compressor 32, the number of divisions may be further increased corresponding to a larger number of compressor stages. In such a case, a total of required compression work can be cut by installing the mixer 36 between every two of the compressors to alternately repeat a temperature rise of the steam caused by the compressor and a temperature fall of the steam caused by the mixer so that the temperature rise caused by the compression is suppressed for each of the compressor stages.

Details of the discharge piping line 25 in the heat pump system according to this first embodiment of the present invention will be described below. From the discharge piping line 25 in the compression unit 34, the return piping line 22 and the heat supply piping line 24 are branched at the branch point 26. The high-temperature and high-pressure steam produced by the second-stage compressor 32 is supplied to one or both of the return piping line 22 and the heat supply piping line 24 depending on the opening of the valve 21 disposed in the return piping line 22 and the opening of the valve 23 disposed in the heat supply piping line 24.

The valve 21 disposed in the return piping line 22 not only controls the flow rate of the supplied steam depending on its opening in accordance with a valve operating signal inputted from the control unit 100 described later in detail, but also serves as to give a throttle resistance against a fluid such that the pressure of the steam supplied to the evaporator 42 via the return piping line 22 is adjusted to a predetermined value. Likewise, the valve 23 disposed in the heat supply piping line 24 controls the flow rate of the supplied steam depending on its opening in accordance with a valve operating signal inputted from the control unit 100 described later in detail. Additionally, the valve 23 may be disposed as a part of the heat pump system or a part of the external heat-utilizing facility 20.

The operation of the heat pump system according to this first embodiment will be described below. In the heat pump system according to this first embodiment, because water is used as the working medium, the temperature of the working medium is about 15° C., i.e., normal temperature of the atmosphere, when the system is in a stopped state. Hence the pressure in the system is held at the steam pressure at 15° C. which is given as the saturated vapor pressure of 0.002 MPa, i.e., at a level close to a vacuum. When hot water of 80° C. is supplied to the hot water line 40 for supplying the heat source to the evaporator 42 and the water temperature in the evaporator 42 becomes about 60° C., the pressure in the system rises to about the steam pressure at that water temperature, which is given as the saturated vapor pressure of 0.02 MPa. Even in such a state, the steam pressure is very low. In order to obtain steam of not lower than the atmospheric pressure (i.e., not lower than temperature of 100° C.) which is useful from the industrial point of view, the turbo compressors 32 and 33 constituting the compression unit 34 have to be operated to increase the temperature and pressure of the steam. In the heat pump system according to this first embodiment, the valve 23 in the heat supply piping line 24 is closed to prevent low-temperature steam, of which pressure is not yet sufficiently increased, from being supplied to the external heat-utilizing facility 20 via the heat supply piping line 24. When a piping line in the external heat-utilizing facility 20 has an end opened to the atmosphere, the closing of the valve 23 further prevents air coming through the open end from flowing backward into the heat pump system in the low-pressure state at startup.

If the compressors 32 and 33 constituting the compression unit 34 in the heat pump system are operated with the valve 21 in the return piping line 22 and the valve 23 in the heat supply piping line 24 being both closed, the high-temperature steam having pressure increased by the compressors 32 and 33 has no discharge path for exhaust. In other words, the operating point of the compressors is under conditions where the flow rate is 0 and the pressure ratio is high. The operation of the compressors 32 and 33 at that operating point of the low flow rate and the high pressure ratio causes surging, i.e., un-steady fluid phenomenon, thus resulting in a risk that the compressors may be damaged due to gas flow vibrations. To avoid such a risk, in the heat pump system according to this first embodiment, the motor 1 is driven in accordance with the control signal S from the control unit 100 to increase the rotational speed of the compressors 32 and 33 as follows. When the temperature and pressure of the steam discharged from the compressors 32, 33 are low at startup, status variables of the steam discharged from the second-stage compressor 32, which are detected by a flow sensor 101, a pressure sensor 102 and a temperature sensor 103 all disposed in the discharge piping line 25, are inputted to the control unit 100. Based on the detection values thus inputted, the control unit 100 computes optimum degrees of valve openings and outputs them as valve operating signals to the valve 21 in the return piping line 22 and the valve 23 in the heat supply piping line 24 so that their valve openings are properly controlled. Stated another way, the valve 23 in the heat supply piping line 24 is closed to prevent supply of the steam having temperature and pressure not yet sufficiently increased, while the valve 21 in the return piping line 22 is opened so that the steam having temperature and pressure not yet sufficiently increased by the operation of the compressors 32 and 33 is returned from the second-stage compressor 32 to the evaporator 42 via the discharge piping line 25 and the return piping line 22 for circulation in the heat pump system. As a result, it is possible to prevent the compressors 32 and 33 from coming into the state of the small flow rate and the high pressure ratio and causing a surge, and to start up the heat pump system with safety.

Also, since the steam having temperature and pressure gradually increased by the operation of the compressors 32 and 33 is returned to the evaporator 42 via the return piping line 22, the returned steam contributes to promoting the evaporation of the liquid water in the evaporator 42 and to increasing the temperature and pressure in the evaporator 42. Therefore, even when the amount of heat supplied from the external heat source to the hot water line 40 disposed in the evaporator 42 is small, the liquid water in the evaporator 42 can be evaporated to increase the amount of the steam required as the working medium.

Further, as the rotational speed of the compressors 32 and 33 is increased by increasing electric power applied to the motor 1 which gives motive power to the compression unit 34, the volume flow rate of the steam sucked into the first-stage compressor 33 is also increased. In view of that fact, the status variables of the steam discharged from the second-stage compressor 32, which are detected by the flow sensor 101, the pressure sensor 102 and the temperature sensor 103 all disposed in the discharge piping line 25, are inputted to the control unit 100. Based on the detection values thus inputted, the control unit 100 computes optimum degrees of valve openings and outputs them as the valve operating signals to the valve 21 in the return piping line 22 and the valve 23 in the heat supply piping line 24 so that their valve openings are properly controlled. Thus, by gradually increasing the opening of the valve 21 in the return piping line 22 depending on an increase in the flow rate and the discharge pressure of the steam discharged from the compressor 32, the rotational speed of the compressors 32 and 33 can be increased without causing a surge.

When the rotational speed of the compressors 32 and 33 is increased and the pressure of the steam, i.e., the working medium in vapor phase, discharged from the second-stage compressor 32 becomes higher than the pressure of the inner atmosphere within the external heat-utilizing facility 20 with which the compressors are in fluid communication, e.g., the atmospheric pressure, this can be regarded as meaning that a situation causing a surge in the compressors is avoided. Therefore, the valve 21 in the return piping line 22 is closed and the valve 23 in the heat supply piping line 24 is opened in accordance with the valve operating signals from the control unit 100 to start the supply of the steam discharged from the compressor 32 to the external heat-utilizing facility 20. Subsequently, the rotational speed of the compressors 32 and 33 is further increased to increase the temperature and pressure of the steam, i.e., the working medium in vapor phase, discharged from the second-stage compressor 32, while continuing the supply of the steam discharged from the compressor 32 to the external heat-utilizing facility 20. When the steam discharged from the compressor 32 reaches the steam condition demanded by the external heat-utilizing facility 20, e.g., the high-pressure and high-temperature state of about 0.4 MPa and about 140° C., the compressors are held in the operating conditions at that time by the control unit 100 to maintain the state that the steam satisfying the above steam condition is continuously supplied from the second-stage compressor 32 to the external heat-utilizing facility 20.

The condition of the steam discharged from the compressors 32 and 33 and supplied to the external heat-utilizing facility 20 can be changed depending on the steam condition demanded by the external heat-utilizing facility 20. In such a case, a signal representing a steam amount D in match with the steam condition demanded by the external heat-utilizing facility 20 is inputted to the control unit 100, and the control unit 100 outputs the control signal S for the motor 1 corresponding to the steam condition demanded by the external heat-utilizing facility 20, thereby adjusting the driving force of the motor 1. Thus, the rotational speed of the compressors 32 and 33 is controlled so as to obtain the steam discharged from the compressors, which satisfies the demanded steam condition.

Further, when the steam amount D demanded by the external heat-utilizing facility 20 varies with time, the signal representing the demanded steam amount D is inputted to the control unit 100, whereupon the control unit 100 computes optimum degrees of the valve openings corresponding to the demanded steam amount D and outputs them as the valve operating signals. Thus, when the steam flow rate demanded by the external heat-utilizing facility 20 is reduced, the valve 21 in the return piping line 22 is opened so that a part of the steam discharged from the second-stage compressor 32 is returned to the evaporator 42 via the discharge piping line 25 and the return piping line 22. At the same time, a valve (not shown) disposed in the hot water line 40, which is associated with the evaporator 42, is slightly closed to reduce the amount of the hot water supplied. As a result, the amount of the steam supplied to the external heat-utilizing facility 20 via the heat supply piping line 24 can be suppressed while the pressure of the steam discharged from the second-stage compressor 32 is maintained constant.

With the heat pump system according to this first embodiment, it is possible to realize a compact heat pump system which can employ water as the working medium without installing a condenser for indirectly supplying heat to the external heat-utilizing facility, can prevent the occurrence of surging in the compressors at startup of the heat pump system, and can directly supply vapor of the working medium (i.e., steam) produced by the compressors to the external heat-utilizing facility.

Second Embodiment

A heat pump system according to a second embodiment of the present invention will be described below with reference to FIG. 3. Since the heat pump system according to this second embodiment has the same basic construction as that of the heat pump system according to the first embodiment shown in FIG. 1, the common construction and operation and the status variables of the working medium are not described here and the following description is made of only different points.

Figure 3:
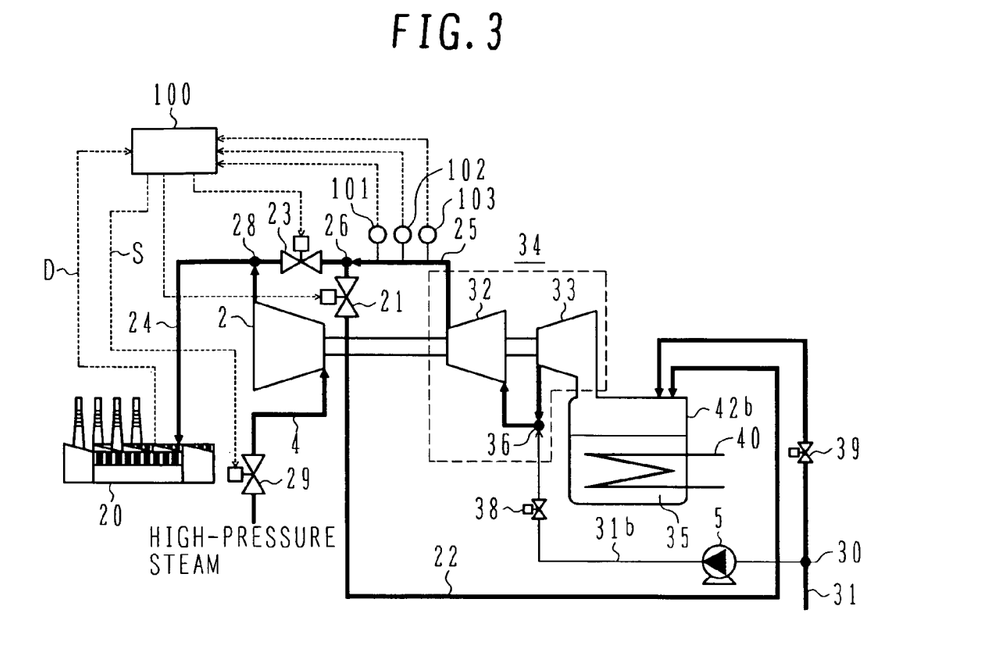
FIG. 3 is a diagram showing the construction of a heat pump system according to a second embodiment of the present invention.

In this second embodiment shown in FIG. 3, as the driving unit for the compressors 32 and 33, a steam turbine 2 coupled to the compressors 32 and 33 through a rotor is used instead of a motor. Also, the evaporator is constituted as an evaporator 42b employing a plate-type heat exchanger allowing passage of a two-phase flow therein instead of the heat exchanger having piping in the form of tubes.

The steam turbine 2 is driven in accordance with the control signal S from the control unit 100 to rotate the compressors 32 and 33. At that time, high-pressure steam of, e.g., about 7 MPa is supplied to the steam turbine 2 from an external high-pressure steam source via a high-pressure steam piping line 4 in which is disposed a valve 29 for controlling the flow rate of the high-pressure steam. The supplied high-pressure steam is used to drive the steam turbine 2 for recovery of motive power and becomes low-pressure steam of, e.g., about 0.4 MPa, which is exhausted from the steam turbine 2 to a merging unit 28 in the discharge piping line 25. The exhausted steam is then supplied, as a heat source of about 140° C., to the external heat-utilizing facility 20 via the discharge piping line 25 and the heat supply piping line 24. The motive power recovered by the steam turbine 2 is used as compression motive power of the compressors 32 and 33 coupled to the steam turbine 2 through the rotor and is utilized to increase the pressure and temperature of the steam supplied from the evaporator 42 to the compressors 32 and 33 up to desired levels. While the high-pressure steam piping line 4 is shown as including the valve 29 for controlling the flow rate of the steam supplied to the steam turbine 2, a similar advantage can also be obtained by installing, instead of the valve 29, a variable stator blade at a turbine inlet.

The evaporator 42b employing the plate-type heat exchanger has a structure made up of plates stacked in the multilayered form so as to partition a fluid in the high-temperature side and a fluid in the low-temperature side from each other. Hot water of, e.g., about 80° C. heated by the external heat source flows through the hot water line 40 in the high-temperature side, and the liquid water 35, i.e., the working medium in the heat pump system, supplied through the water feed line 31 flows in the low-pressure side. Because the fluid in the low-temperature side is the liquid water supplied via the water feed line 31, it is initially the liquid water 35 at low temperature, but the liquid water 35 is gradually evaporated inside the evaporator 42b through heat exchange with the heat source flowing through the hot water line 40 in the high-temperature side. Then, at the time of reaching an outlet of a low-temperature side channel, all the liquid water is evaporated and is supplied, as dry steam having temperature increased to a level a little higher than the saturation temperature, from the evaporator 42b to the inlet of the first-stage compressor 33 of the compression unit 34.

In a situation where the compressor discharge pressure is not sufficiently increased at startup of the heat pump system according to this second embodiment, as described above in connection with the first embodiment shown in FIG. 1, the status variables of the steam discharged from the second-stage compressor 32, which are detected by the flow sensor 101, the pressure sensor 102 and the temperature sensor 103 all disposed in the discharge piping line 25, are inputted to the control unit 100. Based on the detection values thus inputted, the control unit 100 computes optimum degrees of the valve openings and outputs them as the valve operating signals to the valves 23 and 21 such that the valve 23 in the heat supply piping line 24 is closed and the valve 21 in the return piping line 22 is opened. The steam discharged from the outlet of the second-stage compressor 32 to the discharge piping line 25 and having pressure not yet sufficiently increased can be thereby returned to the evaporator 42b via the return piping line 22. Further, in the evaporator 42b, the liquid water supplied via the water feed line 31 is mixed with the steam returned via the return piping line 22, whereby evaporation of a part of the liquid water 35 is promoted in the evaporator 42b by the heat of the returned steam. When the liquid water is not sufficiently evaporated only by the amount of heat of the steam introduced through the return piping line 22, the evaporation of the liquid water residing in the evaporator 42b can be further promoted by supplying the hot water via the hot water line 40 as the external heat supply source, or by increasing the amount of the hot water supplied. As a result, the liquid water residing in the evaporator 42b in the low-temperature side is completely evaporated to become dry steam before reaching the outlet of the evaporator 42b, followed by being supplied to the first-stage compressor 33 of the compression unit 34.

The operation of the heat pump system according to this second embodiment will be described below. When the heat pump system is in a stopped state, the system is entirely filled with the steam at about room temperature, i.e., 15° C., and the pressure in the system is held at the saturated vapor (steam) pressure of 0.002 MPa at that temperature. Then, hot water is supplied from the external heat source via the hot water line 40 disposed in the evaporator 42b to increase the temperature in the evaporator 42b. In accordance with the control signal S from the control unit 100, the valve 29 is opened to supply the high-temperature steam to the steam turbine 2 from the exterior via the high-pressure steam piping line 4, thereby driving the steam turbine 2. The motive power of the steam turbine 2 increases the rotational speed of the compressors 32 and 33 constituting the compression unit 34.

Steam produced from a part of the liquid water 35 evaporated through heat exchange in the evaporator 42b is increased in pressure and temperature while undergoing compression work of the compressors 32 and 33, and is delivered as high-temperature steam to the discharge piping line 25 from the discharge side of the second-stage compressor 32. For a while immediately after the startup of the heat pump system, the compressor discharge pressure is not yet sufficiently increased. Therefore, as described above, the valve 23 in the heat supply piping line 24 is closed and the valve 21 in the return piping line 22 is opened in accordance with the valve operating signals computed by the control unit 100 so that the steam having the pressure not yet sufficiently increased by the compressors 32 and 33 is returned to the evaporator 42b via the return piping line 22. Because the amount of heat of the heated steam returned to the evaporator 42b can be utilized to evaporate the liquid water in the evaporator 42b, it is possible to cut the amount of heat to be supplied from the exterior via the hot water line 40.

The rotational speed of the compressors 32 and 33 can be increased by increasing the amount of steam supplied to the steam turbine 2. More specifically, the valve 29 is opened to increase the amount of the steam supplied via the high-pressure steam piping line 4, thereby increasing the motive power of the steam turbine 2. At the same time, the amount of the steam having the pressure not yet sufficiently increased and returned to the evaporator 42b under control of the control unit 100 while flowing downstream through the return piping line 22 is adjusted by controlling the opening of the valve 21 so that the temperature and pressure in the evaporator 42b are brought into predetermined levels. As a result, the compressor rotational speed can be increased without causing a surge. When the compressor rotational speed is increased and the pressure of the steam discharged from the second-stage compressor 32 becomes higher than the pressure of the inner atmosphere within the external heat-utilizing facility 20 with which the compressors are in fluid communication, e.g., the atmospheric pressure, this can be regarded as meaning that a situation causing a surge in the compressors is avoided. Therefore, the valve 21 in the return piping line 22 is closed and the valve 23 in the heat supply piping line 24 is opened in accordance with the valve operating signals from the control unit 100 to start the supply of the steam discharged from the compressor 32 to the external heat-utilizing facility 20. Subsequently, when the rotational speed of the compressors 32 and 33 is further increased and the steam discharged from the compressor 32 reaches the steam condition demanded by the external heat-utilizing facility 20, e.g., the state of high-pressure and high-temperature steam at about 0.4 MPa and about 140° C., the compressors are held in the operating conditions at that time by the control unit 100 to maintain the state that the steam satisfying the above steam condition is continuously supplied from the second-stage compressor 32 to the external heat-utilizing facility 20.

When the steam is supplied from the steam turbine 2 to the external heat-utilizing facility 20, the respective openings of the valves 23 and 29 are controlled in accordance with the valve operating signals from the control unit 100 so that the pressure of the high-temperature steam discharged from the second-stage compressor 32 and the pressure of the steam exhausted from the steam turbine 2 are well balanced at the merging unit 28. With such control, the steam can be supplied to the external heat-utilizing facility 20 via the heat supply piping line 24 without causing a backward flow of the steam.

This second embodiment can provide similar advantages to those in the above-described first embodiment. Further, this second embodiment can provide other operational advantages as follows.

According to this second embodiment, since the steam turbine 2 is used as the driving unit for the compressors 32 and 33, the heat pump system can be operated even in a place where electric power supply equipment is not installed, if there is equipment capable of supplying high-pressure steam, such as a boiler. Also, since the amount of supplied heat is given by not only the amount of heat of the high-pressure steam supplied to the steam turbine from the exterior, but also the amount of heat absorbed from the external heat source by the heat pump system, the amount of available heat can be increased with respect to the same amount of the supplied steam. Therefore, the heat pump system of this second embodiment is particularly effective when the amount of generated heat is to be increased by using an existing boiler. Further, since the steam exhausted from the steam turbine 2 can also be utilized as a heat source supplied to the external heat-utilizing facility 20, the supplied steam can be produced in larger amount than that produced by the motor-type heat pump system using the compressors of the same capacity.

In this second embodiment, the plate-type heat exchanger allowing passage of a two-phase flow therein is employed as the evaporator 42b. Because the plate-type heat exchanger is able to increase the heat transfer area per unit volume in comparison with the tube type, the size of the heat exchanger can be reduced to one-second or -third in comparison with the tube type. The size of the heat exchanger is a dominant factor deciding the overall size of the heat pump system. Accordingly, a smaller size of the heat exchanger is more advantageous from the viewpoints of reducing installation space and production cost.

Third Embodiment

A heat pump system according to a third embodiment of the present invention will be described below with reference to FIG. 4. Since the heat pump system according to this third embodiment has the same basic construction as that of the heat pump system according to the first embodiment shown in FIG. 1, the common construction and operation and the status variables of the working medium are not described here and the following description is made of only different points.

Figure 4:
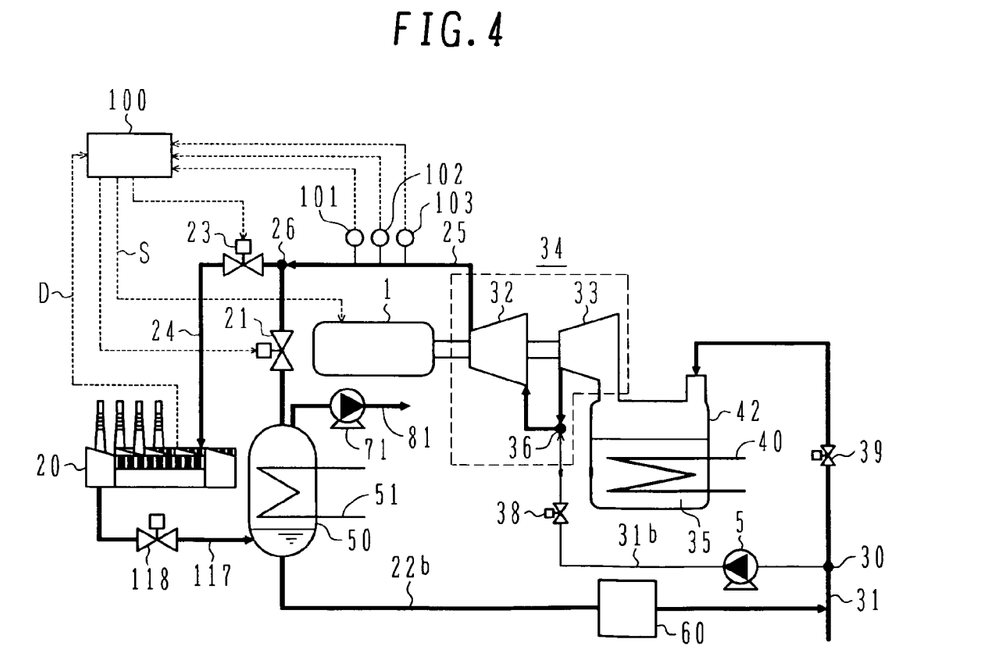
FIG. 4 is a diagram showing the construction of a heat pump system according to a third embodiment of the present invention.

In the heat pump system according to this third embodiment shown in FIG. 4, a cooler 50 is installed midway a return piping line 22b, which is branched from the discharge piping line 25 at the branch point 26 and connected with the water feed line 31 for supplying water, i.e., the working medium in liquid phase, to the evaporator 42, with a cooling water line 51 partly disposed in the cooler 50. In the cooler 50, the steam discharged from the first-stage compressor 33 and the second-stage compressor 32 constituting the compression unit 34 and flowing downstream into the cooler 50 via the return piping line 22b is cooled through heat exchange with a low-temperature fluid supplied from an external cold heat source via the cooling water line 51. The water having been brought into the liquid phase by the cooling flows from the cooler 50 into the water feed line 31 via the return piping line 22b. The high-temperature steam discharged as the vapor of the working medium from the second-stage compressor 32 and supplied to the external heat-utilizing facility 20 via the heat supply piping line 24 becomes liquid water or steam having temperature lowered with absorption of heat in the external heat-utilizing facility 20. The resulting liquid water or steam is recovered from the external heat-utilizing facility 20 to the cooler 50 via a return piping line 117 which is installed for connection between them with a valve 118 disposed in the line 117. Further, the cooler 50 is provided with an exhaust line 81 including a vacuum pump 71 disposed therein to exhaust non-condensable gas residing inside the cooler 50.

While the motor 1 is employed, by way of example, as the driving unit for the compressors 32 and 33, similar advantages to those in this third embodiment can also be obtained even in the case of using a steam turbine instead of the motor.

The operation of the cooler 50 will be described below. In a situation where the discharge pressure of the compressors 32 and 33 is not sufficiently increased, for example, at startup of the heat pump system according to this third embodiment, the valve 23 in the heat supply piping line 24 is closed and the valve 21 in the return piping line 22b is opened so that the steam discharged from the second-stage compressor 32 and having pressure not yet sufficiently increased to a desired value can be returned to the evaporator 42 via the return piping line 22b and the water feed line 31. At that time, in the cooler 50 installed in the return piping line 22b, the steam introduced from the second-stage compressor 32 is cooled by a coolant (cooling water) flowing through the cooling water line 51, whereby the temperature of the steam is reduced to be lower than the saturation temperature thereof for condensation to liquid water. The valve 21 serves not only to regulate the flow rate of the steam introduced to the cooler 50, but also as a pressure control valve for setting the pressure in the cooler 50 to be held at a level slightly higher than the pressure in the evaporator 42.

The water having been brought into the liquid phase and accumulated at the bottom of the cooler 50 is sucked into the evaporator 42 via the return piping line 22b and the water feed line 31 due to the differential pressure between the inner pressure of the cooler 50 and the inner pressure of the evaporator 42. When a sufficient flow speed in the line is not obtained just by the differential pressure between the inner pressures of the cooler 50 and the evaporator 42 due to a piping pressure loss, a pump may be disposed midway the return piping line 22b for boosting of pressure.

Non-condensable gas, such as air, having leaked into the system from the atmosphere, etc. is apt to reside in a place where the steam is condensed. In the heat pump system of this third embodiment, condensation of the steam at the startup of the system takes place primarily inside the cooler 50. Therefore, a large part of the non-condensable gas is accumulated inside the cooler 50. By causing the non-condensable gas residing in the system to be accumulated in the cooler 50 and exhausting the accumulated gas to the exterior through the exhaust line 81 including the vacuum pump 71 disposed therein, purity of the steam in the system can be kept at a high level.

Downstream of the cooler 50 in the return piping line 22b, a water treatment unit 60 is installed to remove impurities from the liquid water residing in the cooler 50 and flowing through the return piping line 22b. The water treatment unit 60 may be any of various types such as using a simple filter or utilizing chemical reaction with the aid of an ion exchange resin and a reverse osmotic membrane. A water treatment method greatly differs depending on the usage of the steam in the external heat-utilizing facility 20, and the method requires to be changed depending on the types of impurities mixed in the steam.

The operation of the heat pump system according to this third embodiment will be described below. At startup of the heat pump system, as in the embodiments described above, the motor 1 is driven to gradually increase the rotational speed of the compressors 32 and 33 in accordance with the control signal S from the control unit 100. Also, in accordance with the valve operating signals inputted from the control unit 100, the valve 23 in the heat supply piping line 24 is closed and the valve 21 in the return piping line 22b is opened so that the steam discharged from the second-stage compressor 32 is all introduced to the cooler 50 and cooled by the coolant supplied via the cooling water line 51 for condensation. On that occasion, the steam introduced to the cooler 50 is cooled to a level substantially equal to the temperature of the liquid water 35 originally residing in the evaporator 42 and is returned to the evaporator 42 via the return piping line 22b and the water feed line 31, whereby the temperature of the liquid water 35 in the evaporator 42 is kept substantially constant. Then, the opening of the valve 21 in the return piping line 22b is further opened in match with the process of increasing the output of the motor 1 to increase the rotational speed of the compressors 32 and 33. At the same time, by increasing both the amount of the external heat supplied to the hot water line 40 disposed in the evaporator 42 and the amount of the external heat source consumed by the cooling water line 51 disposed in the cooler 50 correspondingly, the temperature and pressure of the steam sucked into the compressors 32 and 33 are maintained substantially constant. As a result, the rotational speed of the compressors 32 and 33 can be increased to a predetermined value without causing a surge.

When the compressor rotational speed is increased and the pressure of the steam discharged from the second-stage compressor 32 becomes higher than the pressure of the inner atmosphere within the external heat-utilizing facility 20 with which the compressors are in fluid communication, e.g., the atmospheric pressure, this can be regarded as meaning that a situation causing a surge in the compressors is avoided. Therefore, the valve 21 in the return piping line 22b is closed and the valve 23 in the heat supply piping line 24 is opened in accordance with the valve operating signals from the control unit 100 to start the supply of the steam discharged from the compressor 32 to the external heat-utilizing facility 20. At the time when the valve 21 is closed, the supply of the high-temperature and high-pressure steam to the cooler 50 via the return piping line 22b is stopped, and therefore the supply of the cooling water to the cooling water line 51 is also stopped. Subsequently, when the rotational speed of the compressors 32 and 33 is further increased and the steam discharged from the compressor 32 reaches the steam condition demanded by the external heat-utilizing facility 20, e.g., the state of high-pressure and high-temperature steam at about 0.4 MPa and about 140° C., the compressors are held in the operating conditions at that time by the control unit 100 to maintain the state that the steam satisfying the above steam condition is continuously supplied from the second-stage compressor 32 to the external heat-utilizing facility 20.

This third embodiment can provide similar advantages to those in the above-described first embodiment. Further, this third embodiment can provide other operational advantages as follows.

According to this third embodiment, in comparison with the case of returning the high-temperature and high-pressure steam discharged from the compressor to the evaporator 42 without cooling it, the condition of the steam sucked into the compressors 32 and 33 can be maintained substantially constant with higher reliability, as described above. It is hence just required to control the openings of the valves 21 and 23 with attention paid to only the condition of the steam discharged from the compressors 32 and 33, thus resulting in easier control.

Also, since non-condensable gas having leaked into the system can be exhausted to the exterior of the system through the exhaust line 81 including the vacuum pump 71 disposed therein, and purity of the working medium can be kept at a high level, deterioration of the cycle performance over years can be avoided.

According to this third embodiment, the high-temperature steam supplied from the compressors 32 and 33 to the external heat-utilizing facility 20 via the heat supply piping line 24 becomes liquid water after being used as a heat source, etc. in the external heat-utilizing facility 20 and then being cooled. That liquid water is recovered into the cooler 50 via the return piping line 117 and is returned to the evaporator 42 via the return piping line 22b and the water feed line 31. Therefore, the amount of the liquid water supplied from the exterior to the evaporator 42 via the water feed line 31, etc. can be cut to a large extent. Further, the liquid water recovered into the cooler 50 is temporarily stored in the cooler 50, and non-condensable gas is exhausted to the exterior of the system through the exhaust line 81 including the vacuum pump 71 disposed therein. As a result, the heat pump system can be always operated with high performance. In addition, by using the cooler 50 as a non-condensable gas removing unit to remove the non-condensable gas accumulated in the heat pump system and the external heat-utilizing facility 20 at the startup of the heat pump system, the equipment configuration is simplified, whereby the equipment cost and the installation can be cut.

According to this third embodiment, since the water treatment unit 60 for removing impurities in the water is installed in the return piping line 22b through which the liquid water recovered from the external heat-utilizing facility 20 into the cooler 50 passes, the impurities in the working medium flowing into the evaporator 42 and the compressors 32 and 33 can be reduced. Therefore, the impurities are prevented from adhering to the heat transfer surface of the hot water line 40 and the blade surfaces of the compressors 32 and 33. It is hence possible to suppress deterioration of the performance of the evaporator 42 and the compressors 32 and 33 over years, to maintain high efficiency for a long term, and to cut the maintenance cost.

The types and proportion of impurities mixed in the working medium are greatly changed depending on the usage of heat in the external heat-utilizing facility 20. The proportion of impurities is increased when the steam produced in and supplied from the heat pump system is brought into direct contact with a not-heated member in the external heat-utilizing facility 20, and it is relatively small when that steam is brought into indirect contact with the non-heated member through a heat exchanger, etc. For that reason, in the case of the steam being brought into direct contact with the not-heated member in the external heat-utilizing facility 20 when used therein, the provision of the water treatment unit 60 is effective and the heat pump system can be obtained in which the performance is less subjected to deterioration for a long term.

Fourth Embodiment

Figure 5:
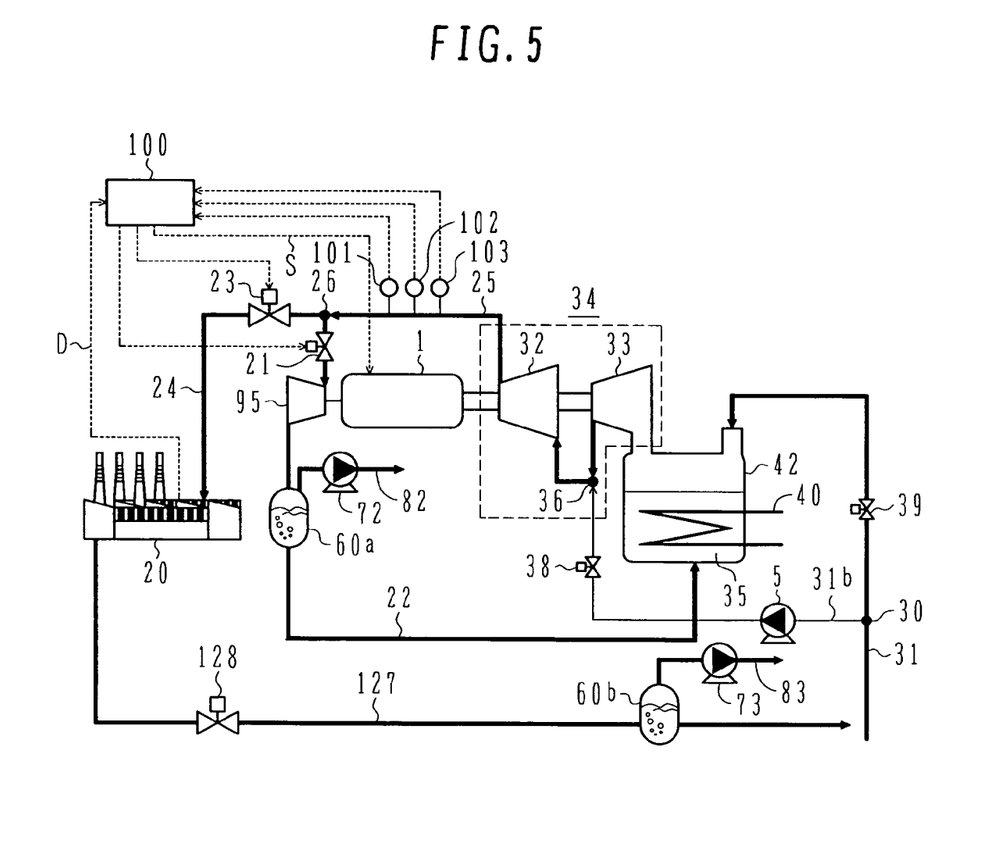
FIG. 5 is a diagram showing the construction of a heat pump system according to a fourth embodiment of the present invention.

A heat pump system according to a fourth embodiment of the present invention will be described below with reference to FIG. 5. Since the heat pump system according to this fourth embodiment has the same basic construction as that of the heat pump system according to the first embodiment shown in FIG. 1, the common construction and operation and the status variables of the working medium are not described here and the following description is made of only different points.

The heat pump system according to this fourth embodiment includes the return piping line 22 for branching the steam discharged from the second-stage compressor 32 at the branch point 26 in the discharge piping line 25 and introducing the branched steam to the evaporator 42, the return piping line 22 being provided with the valve 21. An expansion turbine 95 mechanically coupled to the motor 1 and the compressors 32 and 33 through the rotor is installed midway the return piping line 22. Further, a deaerator 60a provided with a non-condensable gas exhaust line 82 including a vacuum pump 72 disposed therein is disposed in the return piping line 22 downstream of the expansion turbine 95.

In the heat pump system according to this fourth embodiment, the rotational speed of the compressors 32 and 33 is increased by driving the motor 1 in accordance with the control signal S from the control unit 100. In a situation where the discharge pressure of the compressors 32 and 33 is not sufficiently increased, for example, at startup of the heat pump system, as in the above-described embodiments, the valve 23 in the heat supply piping line 24 is closed and the valve 21 in the return piping line 22 is opened in accordance with the valve operating signals from the control unit 100 so that the steam discharged from the second-stage compressor 32 and having pressure not yet sufficiently increased to a desired value is returned to the evaporator 42 via the return piping line 22 without being supplied to the external heat-utilizing facility 20 via the heat supply piping line 24. On that occasion, the expansion turbine 95 is driven by the steam flowing downstream through the return piping line 22 to extract motive power from the steam, while the pressure and temperature of the steam are reduced to such an extent as enough for condensation. The condensed liquid water is supplied to the deaerator 60a installed in the downstream side of the return piping line 22. After non-condensable gas present in the supplied steam has been exhausted to the exterior through the exhaust line 82 including the vacuum pump 72 disposed therein, the degassed steam is returned to the evaporator 42 via the return piping line 22.

When the compressor rotational speed is increased and the pressure of the steam discharged from the second-stage compressor 32 becomes higher than the pressure of the inner atmosphere within the external heat-utilizing facility 20 with which the compressors are in fluid communication, e.g., the atmospheric pressure, this can be regarded as meaning that a situation causing a surge in the compressors is avoided. Therefore, the valve 21 in the return piping line 22 is closed and the valve 23 in the heat supply piping line 24 is opened in accordance with the valve operating signals from the control unit 100 to start the supply of the steam discharged from the compressor 32 to the external heat-utilizing facility 20. Subsequently, when the rotational speed of the compressors 32 and 33 is further increased and the steam discharged from the compressor 32 reaches the steam condition demanded by the external heat-utilizing facility 20, e.g., the state of high-pressure and high-temperature steam at about 0.4 MPa and about 140° C., the compressors are held in the operating conditions at that time by the control unit 100 to maintain the state that the steam satisfying the above steam condition is continuously supplied from the second-stage compressor 32 to the external heat-utilizing facility 20.

Further, the heat pump system according to this fourth embodiment includes a return piping line 127 for introducing liquid water from the external heat-utilizing facility 20 to the water feed line 31. A valve 128 and a deaerator 60b are installed in the return piping line 127, the deaerator 60b being provided with an exhaust line 83 including a vacuum pump 73 disposed therein. The high-temperature steam supplied from the compressors 32 and 33 to the external heat-utilizing facility 20 via the heat supply piping line 24 becomes liquid water after being used as a heat source, etc. in the external heat-utilizing facility 20 and then being cooled. That liquid water is recovered from the external heat-utilizing facility 20 into the deaerator 60b via the return piping line 127, followed by being returned to the evaporator 42 via the return piping line 127 and the water feed line 31. Therefore, the amount of the liquid water supplied from the exterior to the evaporator 42 via the water feed line 31, etc. can be cut to a large extent. Further, non-condensable gas in the liquid water recovered into the deaerator 60b is removed in the deaerator 60b and is exhausted to the exterior of the system through the exhaust line 83 including the vacuum pump 73 disposed therein. As a result, the heat pump system can be always operated with high performance. In addition, by using the deaerator 60a and 60b as non-condensable gas removing units to remove the non-condensable gas accumulated in the heat pump system and the external heat-utilizing facility 20 at the startup of the heat pump system, the equipment configuration is simplified, whereby the equipment cost and the installation can be cut.

This fourth embodiment has the basic construction common to that of the above-described first embodiment and therefore can provide similar advantages to those in the above-described first embodiment. Further, this fourth embodiment can provide other operational advantages as follows.

According to this fourth embodiment, the pressure and temperature of the steam can be made closer to those in the original state in the evaporator 42 by providing the expansion turbine 95 which recovers the motive power applied from the compressors 32 and 33, which are driven by the motive power of the motor 1. Additionally, since the motive power recovered by the expansion turbine 95 is effectively utilized as the compression motive power of the compressors 32 and 33, the electric power to be supplied to the motor 1 can be made much smaller than that required in the case of not employing the expansion turbine 95.

Assuming, for example, that the efficiency of the expansion turbine 95 and the compressors 32 and 33 is 80% and the motive power required for rotating the compressors 32 and 33 is 1, power consumption is expressed by 1 (required motive power)−0.8 (motive power applied from the compressors)× 0.8 (motive power recoverable by expansion turbine)=0.36. In other words, the motor 1 is just required to supply about 36% of the motive power to be supplied in the case of not employing the expansion turbine 95. With the provision of the expansion turbine 95, it is possible to maintain the state in the evaporator 42 constant at the startup of the heat pump system, and to greatly cut the motive power necessary for the startup.

Further, in comparison with the case of employing the valve 21 and the cooler 50 as in the third embodiment shown in FIG. 4, a pressure loss caused by the valve 21 can be reduced. Moreover, since this fourth embodiment does not include the cooling water line 51 through which effective heat is brought to the exterior from the cooler 50, a loss caused at the startup can be suppressed smaller. In addition, the absence of the cooling water line 51 enables the overall arrangement of the piping lines to be simplified correspondingly.

While the fourth embodiment is illustrated, by way of example, as controlling the amount of the steam supplied from the compressors 32 and 33 to the return piping line 22 depending on the opening of the valve 21, similar advantages can also be obtained with such a modification that a variable stator blade is disposed at an inlet of the expansion turbine 95 instead of the valve 21 and a mount angle of the stator blade is changed to control the amount of the steam supplied to the return piping line 22.

The present invention can be usefully applied as heat pump systems in a wide range of industrial fields.

what is claimed is:

1. A heat pump system comprising:
an evaporator for recovering heat of an external heat source to a working medium supplied as liquid water from an exterior via a water feed channel, thereby evaporating the working medium;
a turbo compressor for compressing the working medium evaporated in said evaporator and increasing temperature of the evaporated working medium;
a driving unit for providing motive power to drive said turbo compressor;
a supply channel for supplying, as a heat source, vapor of the working medium having temperature increased by said turbo compressor to an external heat-utilizing facility; and
a return channel branched from said supply channel and introducing the working medium discharged from said turbo compressor to said evaporator,
wherein the return channel is a different channel from the supply channel, and
wherein the point where the return channel is branched from the supply channel is located between the turbo compressor and the external heat-utilizing facility.

2. The heat pump system according to claim 1, wherein said turbo compressor for compressing the working medium evaporated in said evaporator and increasing temperature of the evaporated working medium is comprised of a plurality of divided units,
said water feed channel for supplying liquid water from the exterior to said evaporator is branched to form a branch line for introducing the liquid water,
said branch line is connected with a channel interconnecting said plurality of divided units of turbo compressors and allowing passage of the vapor of the working medium, and
the liquid water introduced via said branch line is supplied to mix into the vapor of the working medium flowing between said plurality of divided units of turbo compressors.

3. The heat pump system according to claim 1, wherein said return channel branched from said supply channel and introducing the working medium discharged from said turbo compressor to said evaporator is in fluid communication with said evaporator directly or indirectly via said water feed channel, and a cooler for cooling and condensing the working medium discharged from said turbo compressor and flowing downstream through said return channel is installed in said return channel.

4. The heat pump system according to claim 1, wherein said return channel branched from said supply channel and introducing the working medium discharged from said turbo compressor to said evaporator includes a cooler installed therein for cooling and condensing the working medium discharged from said turbo compressor and flowing downstream through said return channel, and a cooling line for introducing a cooling fluid from an external cold heat source and an exhaust line for exhausting non-condensable gas in the working medium to the exterior are connected to with said cooler.

5. The heat pump system according to claim 1, wherein said return channel branched from said supply channel and introducing the working medium discharged from said turbo compressor to said evaporator includes a cooler installed therein for cooling and condensing the working medium discharged from said turbo compressor and flowing downstream through said return channel,
a cooling line for introducing a cooling fluid from an external cold heat source and an exhaust line for exhausting non-condensable gas in the working medium to the exterior are connected to said cooler, and a water treatment unit for removing impurities from the condensed working medium flowing downstream through said return channel is installed in said return channel downstream of said cooler.

6. The heat pump system according to claim 1, wherein said return channel branched from said supply channel and introducing the working medium discharged from said turbo compressor to said evaporator includes a cooler installed therein for cooling and condensing the working medium discharged from said turbo compressor and flowing downstream through said return channel, and said heat pump system further comprises a first piping line for introducing the working medium, which has become liquid water or vapor having reduced temperature after absorption of heat in said external heat-utilizing facility, from said external heat-utilizing facility to said cooler.

7. The heat pump system according to claim 1, wherein said return channel branched from said supply channel and introducing the working medium discharged from said turbo compressor to said evaporator includes an expansion turbine installed therein and driven by the working medium flowing downstream from said turbo compressor through said return channel, and said expansion turbine is mechanically coupled to said turbo compressor and transmits motive power generated by said expansion turbine to said turbo compressor.

8. The heat pump system according to claim 1, wherein said return channel branched from said supply channel and introducing the working medium discharged from said turbo compressor to said evaporator includes an expansion turbine installed therein and driven by the working medium flowing downstream from said turbo compressor through said return channel, said expansion turbine is mechanically coupled to said turbo compressor and transmits motive power generated by said expansion turbine to said turbo compressor, and a deaerator for degassing the working medium flowing downstream through said return channel via said expansion turbine is installed in said return channel.

9. The heat pump system according to claim 1, wherein said heat pump system further comprises a second piping line for introducing the working medium, which has become liquid water or vapor having reduced temperature after absorption of heat in said external heat-utilizing facility, from said external heat-utilizing facility to said evaporator, and a deaerator for degassing the working medium flowing downstream through said second piping line is installed in said second piping line.

10. The heat pump system according to claim 1, wherein water is used as the working medium in said heat pump system.

11. The heat pump system according to claim 1, wherein supply temperature of the vapor of the working medium discharged from said turbo compressor and supplied to said external heat-utilizing facility is set to be higher than water condensation temperature.

12. The heat pump system according to claim 1, further comprising a first valve disposed in said supply channel, a second valve disposed in said return channel, a sensor for detecting a status variable of the working medium discharged from said turbo compressor, and a control unit for controlling openings of said first and second valves in accordance with the status variable of the working medium.

13. The heat pump system according to claim 1, wherein a steam turbine driven by high-pressure steam supplied from the exterior is used as said driving unit for providing motive power to drive said turbo compressor, and steam exhausted after being used to perform work in said steam turbine is merged with the vapor of the working medium discharged from said turbo compressor and is supplied to said external heat-utilizing facility.

* * * * *